United States Patent Office 3,513,138
Patented May 19, 1970

3,513,138
ACRYLONITRILE COPOLYMERS
Heinrich Rinkler and Gunther Nischk, Dormagen, Germany, assignors to Farbenfabriken Bayer Aktiengesellschaft, Leverkusen, Germany, a corporation of Germany
No Drawing. Filed Feb. 26, 1968, Ser. No. 707,930
Claims priority, application Germany, Mar. 3, 1967, F 51,706
Int. Cl. C08f 15/22, 15/32
U.S. Cl. 260—79.3                 9 Claims

ABSTRACT OF THE DISCLOSURE

The invention relates to acrylonitrile copolymers containing in copolymerised form at least 50% acrylonitrile, 0.1 to 20% of compound of the general formula

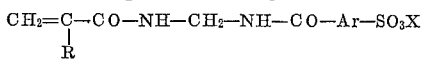

wherein R represents hydrogen or a $C_1$ to $C_4$ alkyl radical, Ar represents an aryl radical and X represents hydrogen or an alkali metal atom, the balance being one or more copolymerisable compounds, and to a process for their production.

---

The inventon relates to acrylonitrile copolymers which have a good affinity for basic dyes, and to a process for their preparation by copolymerising acrylonitrile with unsaturated compounds containing sulfonic acid groups.

Filaments and yarns produced from acrylonitrile homopolymers and copolymers with neutral comonomers have insufficient affinity for dyes for practical purposes. To increase the dyeability, copolymers including carboxyl-containing components, such as acrylic, methacrylic or itaconic acids have already been produced. These polymers, however have an exceptionally high tendency to undergo discolouration at elevated temperatures.

The affinity of these polymers for basic dyes can be increased by copolymerising comonomers with sulfo groups but the known processes are still unsatisfactory in many ways from a technical point of view. Sodium methallyl sulfonates and sodium allyl sulfonates or N-monosubstituted acrylamide derivatives, such as N-acryloyl-taurine, can only be copolymerised with acrylonitrile in poor yields and only a portion of the comonomer used is incorporated into the polymer.

It is an object of this invention to provide acrylonitrile copolymers containing at least 50% by weight of copolymerised acrylonitrile and 0.1 to 20% by weight of a copolymerised ethylenically unsaturated N - acylamido-methylene-N-aryl-amidosulfonic acid of the general formula

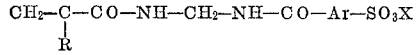

wherein R represents hydrogen or a $C_1$ to $C_4$ alkyl radical, Ar represents an aryl radical and X represents hydrogen or an alkali metal atom, the balance being up to 45% by weight of another copolymerisable monomer selected from the group consisting of acrylic and vinyl compounds, said acrylonitrile copolymer having a K-value (according to Fikentscher, Alhulosechemie 13, p. 58 (1932)) in the range of from about 70 to about 110.

It is another object of this invention to provide a process for the production of acrylonitrile copolymers which comprises copolymerising at least 50% by weight of acrylonitrile with 0.1 to 20% by weight of an ethylenically unsaturated sulfonic acid compound of the formula

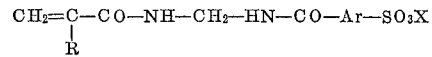

wherein R represents hydrogen or a $C_1$ to $C_4$ alkyl radical, Ar represents an aryl radical and X represents hydrogen or an alkali metal atom, the balance being one or more additional copolymerisable monomers, the percentages by weight being based on the total of the monomers being used, said copolymerising being effected in a liquid medium in the presence of a radical forming catalyst system.

The unsaturated N-acylamido-methylen-N-arylamido-sulfonic acids can be prepared by condensation of aryl-amido-N-methylolsulfonic acids and unsaturated amides or by condensation of the N-methylol compounds of unsaturated amides with aryl carbonamide sulfonic acids in acid media (e.g. glacial acetic acid and hydrochloric acid). The amido-N-methylol compounds are prepared by reacting formaldehyde with the appropriate unsaturated amides or aryl carbonamide sulfonic acids.

The following compounds, for example, may be used as unsaturated sulfonic acids:

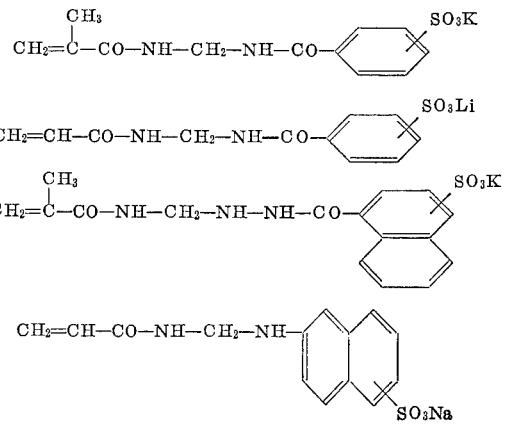

When the polymerisation is carried out in an aqueous medium, catalyst systems (e.g. persulfate/bisulfite) which yield end groups which bind cationic dyes are generally employed. If the copolymers are intended to be used for the production of fibres and filaments, 0.5 to 1.0% of the unsaturated sulfonic acid is generally sufficient to achieve the dyeability required in practice.

In order to obtain special properties e.g. a large increase in the hydrophilic character or the swelling capacity of the polymers, the said comonomers may be incorporated quantities of up to 20%.

When acrylonitrile is polymerised by solution polymerisation in organic solvents, such as, dimethylformamide, dimethylacetamide, dimethylsulfoxide or ethylene glycol carbonate, 2 to 4% of unsaturated sulfonic acid, based on the total quantity of monomer, is generally employed to ensure adequate dyeability of the polymer.

The copolymerization of acrylonitrile with the sulfonic acids according to the invention is preferably carried out in the presence of other copolymerizable unsaturated compounds. Such compounds include, inter alia, acrylates and methacrylates, vinyl esters, styrene and its neutral derivatives, vinyl chloride, vinylidene chloride, vinyl bromide, butadiene, chloroprene, acrylamide and methacrylamide, vinyl alkyl ketones, vinylidene cyanide and divinyl compounds and also basic comonomers such as vinyl pyridine and its derivatives.

By incorporating a third comonomer by copolymerisation, e.g. methyl acrylate, methyl methacrylate or vinyl acetate, the solubility of the polymers so produced can be increased and the dyeing properties of the fibres further improved. The amount of the above mentioned comonomers contained in the polymer may be 2 to 20% and is preferably 5 to 7%.

For special purposes, such as reducing the inflammability and combustibility of the fibres and filaments, while retaining good dyeability and thermostability, 25 to 45% of vinylidene chloride is preferably copolymerised in addition to the component which contains sulfonic acid groups.

The copolymerisation of acrylonitrile can be carried out by known polymerisation processes, e.g. in aqueous emulsion, dispersion or in solution. Aqueous polymerisation is prefably carried out using water-soluble, free-radical forming catalyst systems. These can be inorganic or organic "per" compounds or azo compounds although it is preferred to use redox systems, particularly those based on "per" compounds and sulfur compounds in lower oxidation states. The "per" compounds used are preferably water-soluble salts of peroxy disulfuric acid, such as potassium, sodium or ammonium persulfate.

Suitable reducing components are sulfur dioxide, alkali metal hydrosulfites, alkali metal pyrosulfites and alkali metal thiosulfates.

The catalysts are used in quantities of 0.5 to 5% based on the total weight of the monomers. The ratio of oxidising to reducing agent in the redox system may lie between 2:1 and 1:50 and is preferably between 1:2 and 1:10.

The deionised water used amounts to about 5 to 10 times the quantity of monomers used. The reaction temperature may lie between +10 and +70° C. and is preferably between +40 and +60° C. Polymerisation is carried out at a pH of 1 to 6, preferably 2.5 to 4.

When copolymerization is carried out in an aqueous medium or in solvents, the unsaturated sulfonic acids according to the invention yield polymers which are improved in their hydrophilic character and can be dyed to deep tones with basic dyes. The polymers and their solutions have very good thermostability and little tendency to discolouration. In solvents, such as dimethylformamide or dimethylsulfoxide, the polymers obtained by aqueous precipitation polymerisation yield clear, gel-free solutions which can easily be spun.

An example of the preparation of an unsaturated sulfonic acid is described below:

119 parts of potassium 4-carbonamido benzene sulfonate

which can easily be prepared from potassium 4-carbomethoxybenzene-sulfonate and ammonia, is stirred with 5 parts of potassium carbonate in 50 parts of water, and 75 parts of 30% formalin solution are added at 60 to 80° C. The reaction is complete after one hour, the reaction mixture is left to cool and the methylol compound

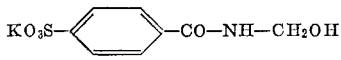

is filtered off. Yield 130.5 parts (97%).

404 parts of

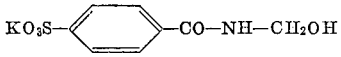

(1.5 mol) and 127.5 parts of methacrylamide (1.5 mol) are dissolved in a mixture of 1500 parts of glacial acetic acid, 35 parts of concentrated hydrochloric acid and 600 parts of water. The reaction mixture is stabilized with 7 parts of thiosemicarbazide. The reaction mixture is stirred for 12 to 16 hours at 60° C. and then evaporated almost to dryness under vacuum. The residue is taken up in 1000 parts of ethanol and filtered using suction.

The yield of

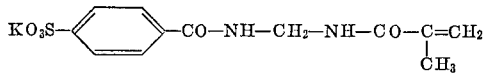

is 472 parts (94%).

The following examples are to further illustrate the invention without limiting it.

EXAMPLE 1

The reaction mixture consisting of 1860 parts of deionised water, 127.4 parts of acrylonitrile, 7 parts of methyl acrylate and 5.6 parts of the compound

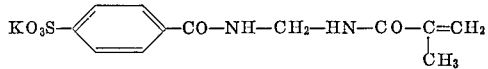

is heated to 50° C. under a nitrogen atmosphere. Polymerisation is initiated at this temperature with the mixture of 1 part of potassium persulfate and 4 parts of sodium metabisulfite. Polymerisation is carried out for 3 to 4 hours at 55 to 60° C. and the white polymer so obtained is filtered off and thoroughly washed with water. The polymer is dried in a vacuum drying cupboard at 50 to 60° C. Yield 129 parts (92%). K-value (according to Fikentscher, Cellulosechemie 13, page 58, 1932): 84.5.

EXAMPLE 2

3800 parts of deionised water, 187.6 parts of acrylonitrile, 84 parts of vinylidene chloride and 8.4 parts of the compound

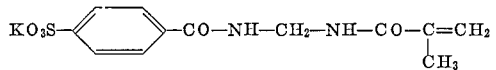

are vigorously stirred under a nitrogen atmosphere and the activating mixture of 2.0 parts of potassium persulfate and 3.7 parts of sodium metabisulfite is then added at 35 to 40° C. The polymerisation temperature is allowed to rise from 50 to 55° C. over a period of 4 to 5 hours. The finely granular polymer is then filtered off, thoroughly washed with water and dried in a vacuum drying cupboard at 50° C.

The yield of polymer is 225 parts (80.5%) which has a K-value of 79.5.

EXAMPLE 3

930 parts of deionised water, 65.1 parts of acrylonitrile, 3.5 parts of methyl acrylate and 1.4 parts of the compound

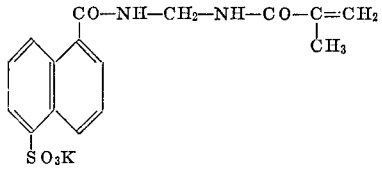

are heated to 55° C. under a nitrogen atmosphere. Polymerisation is started with a mixture of 0.5 part of potassium persulfate and 3.9 parts of sodium metabisulfite. The polymerisation time at 55 to 60° C. is 4 to 5 hours; the reaction mixture is then filtered and the polymer is washed with water until salt-free. After drying at 50° C., 58 parts of polymer (83%) of K-value 81.5 are obtained.

The sulfonic acid groups contained in the polymer are determined by potentiometric titration in dimethylformamide solution. For example, 1 g. of polymer dissolved in 100 ml. of dimethylformamide is treated with a mixed bed ion exchanger and then with a strongly acid ion exchanger and titrated with N/10 or N/100 methanolic KOH. The measuring apparatus used is a pH meter supplied by the firm Knick as Type 52 (Calomel glass electrode). The measured values are indicated as milli-equivalents of acid groups per 1000 g. of polymers. The increased dyeability of the polymers can be shown from the fact that films produced from them can be strongly coloured with basic dyes. The films are produced in a layer of a thickness of about 15μ from a 15% dimethylformamide solution, washed free from solvent, and dyed with Astrazon Blue B (colour Index 2nd ed., vol. III, No. 41140) in a dye bath of the following composition: 100.0 ml. Astrazon Blue B solution (1 g./l.), 2.0 ml. acetic acid (30 g./l.), 0.3 ml. sodium acetate (40 g./l.), for one hour at boiling point.

The amount of dye taken up is determined quantitatively by dissolving the dyed films in dimethylformamide containing 1 g. of sulfuric acid per litre. The amount of dye (in grams) per gram of the film is determined at a wavelength of 620 m$\mu$ using a photometer (Type BFK Photometer DS 1, Firma Kipp and Zonen) and a calibrating curve.

To test the tendency to discolouration, 5% solutions (in dimethylformamide) of the copolymers are prepared and tempered at 80° C. for 20 hours in the presence of air. The discolouration is determined at a wavelength of 470 m$\mu$ (length of tube 1 cm., standard solution pure DMF) with the same apparatus as used above.

The standard polymer used was a polyacrylonitrile sample which contained 5% methyl acrylate and had a K-value of 86.

| | Milliequivalents acid groups/ 1,000 g. Pm | G. dye/ g. film | Extinction value (470 m/$\mu$) |
|---|---|---|---|
| Polymer from Example No.: | | | |
| 1 | 131.5 | 3.25·10⁻² | 0.059 |
| 2 | 102.0 | 2.2·10⁻² | 0.068 |
| 3 | 63.5 | 1.45·10⁻² | 0.075 |
| Standard polymer | 23.0 | 0.51·10⁻² | 0.072 |

What we claim is:

1. An acrylonitrile copolymer containing at least 50% by weight of copolymerised acrylonitrile and 0.1 to 20% of a copolymerised ethylenically unsaturated N-acyl-amido-methylene-N-aryl-amidosulfonic acid of the general formula

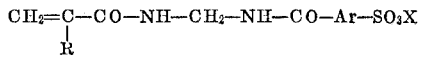

wherein R represents hydrogen or a $C_1$ to $C_4$ alkyl radical, Ar represents an aryl radical and X represents hydrogen or an alkali metal atom, the balance being up to 45% by weight of another copolymerisable monomer selected from the group consisting of acrylic and vinyl compounds, said acrylonitrile copolymer having a K-value (according to Fikentscher, Allulosechemie 13, p. 58 (1932)) in the range of from about 70 to about 110.

2. The copolymer of claim 1 wherein R is hydrogen.
3. The copolymer of claim 1 wherein R is methyl.
4. The copolymer of claim 1 wherein Ar is phenylene.
5. The copolymer of claim 1 wherein Ar is naphthylene.
6. The copolymer of claim 1 containing 2 to 20% by weight of copolymerized methyl acrylate, methyl methacrylate or vinyl acetate.
7. The copolymer of claim 6 wherein the copolymerized methyl acrylate, methyl methacrylate or vinyl acetate is present in amounts of 5 to 7% by weight.
8. The copolymer of claim 6 containing copolymerized methyl acrylate.
9. The copolymer of claim 1 containing 25 to 45% by weight of copolymerized vinylidene chloride.

References Cited

UNITED STATES PATENTS 3,408,338  10/1968  Szita _____ 260—79.3
3,417,134  12/1968  Rinkler _____ 260—506

JOSEPH L. SCHOFER, Primary Examiner

C. A. HENDERSON, JR., Assistant Examiner

U.S. Cl. X.R.

8—3; 260—85.5, 506, 558